United States Patent
Cheng

(10) Patent No.: US 8,702,057 B2
(45) Date of Patent: Apr. 22, 2014

(54) BELLOWS SEAL ASSEMBLY AND BELLOWS VALVE EQUIPPED THEREWITH

(75) Inventor: Xingyan Cheng, Hangzhou (CN)

(73) Assignee: Zhejiang Wanlong Machinery Co., Ltd., Hangzhou (CN)

(*) Notice: Subject to any disclaimer, the term of this patent is extended or adjusted under 35 U.S.C. 154(b) by 75 days.

(21) Appl. No.: 13/466,093

(22) Filed: May 7, 2012

(65) Prior Publication Data

US 2012/0217429 A1 Aug. 30, 2012

Related U.S. Application Data

(63) Continuation-in-part of application No. PCT/CN2011/076619, filed on Jun. 30, 2011.

(30) Foreign Application Priority Data

Jul. 5, 2010 (CN) .......................... 2010 1 0218706

(51) Int. Cl.
*F16K 41/10* (2006.01)

(52) U.S. Cl.
USPC .................. 251/214; 251/330; 251/335.3

(58) Field of Classification Search
USPC .................. 251/214, 318, 330, 335.3, 332
See application file for complete search history.

(56) References Cited

U.S. PATENT DOCUMENTS

| | | | | |
|---|---|---|---|---|
| 2,880,620 A | * | 4/1959 | Bredtschneider | 251/335.3 |
| 3,315,700 A | * | 4/1967 | Greenwood | 251/335.3 |
| 3,826,465 A | * | 7/1974 | Whittaker et al. | 251/335.3 |
| 4,214,727 A | * | 7/1980 | Baram | 251/214 |
| 4,342,328 A | * | 8/1982 | Matta | 251/335.3 |
| 5,915,410 A | * | 6/1999 | Zajac | 251/335.3 |
| 6,178,989 B1 | * | 1/2001 | Windschmitt et al. | 137/375 |
| 6,202,984 B1 | * | 3/2001 | Fichtner et al. | 251/335.3 |

FOREIGN PATENT DOCUMENTS

| | | |
|---|---|---|
| CN | ZL94205272.2 | 1/1996 |
| DE | 1 897 709 | 7/1964 |
| FR | 1.249.377 | 12/1960 |

* cited by examiner

*Primary Examiner* — John Bastianelli
(74) *Attorney, Agent, or Firm* — Matthias Scholl P.C.; Matthias Scholl

(57) ABSTRACT

A bellows seal assembly and bellows valve equipped therewith. The bellows seal assembly includes an internal bellows, an external bellows, a hollow upper bellows seat, a first hollow lower bellows seat, and a second hollow lower bellows seat. One end of the internal bellows is fixed to the upper bellows seat and the other end is fixed to the second lower bellows seat. One end of the external bellows is fixed to the upper bellows seat and the other end is fixed to the first lower bellows seat. The external bellows is sheathed around the internal bellows. The first lower bellows seat is sheathed around the second lower bellows seat. The bellows valve includes the bellows seal assembly.

8 Claims, 4 Drawing Sheets

BELLOWS SEAL ASSEMBLY AND BELLOWS VALVE EQUIPPED THEREWITH

CROSS-REFERENCE TO RELATED APPLICATIONS

This application is a continuation-in-part of International Patent Application No. PCT/CN2011/076619 with an international filing date of Jun. 30, 2011, designating the United States, now pending, and further claims priority benefits to Chinese Patent Application No. 201010218706.7 filed Jul. 5, 2010. The contents of all of the aforementioned applications, including any intervening amendments thereto, are incorporated herein by reference.

CORRESPONDENCE ADDRESS

Inquiries from the public to applicants or assignees concerning this document should be directed to: MATTHIAS SCHOLL P.C., ATTN.: DR. MATTHIAS SCHOLL ESQ., 14781 MEMORIAL DRIVE, SUITE 1319, HOUSTON, Tex. 77079.

BACKGROUND OF THE INVENTION

1. Field of the Invention

The invention relates to a bellows seal assembly and bellows valve equipped therewith, which are mainly applicable to places with height restrictions after the valve is installed.

2. Description of the Related Art

A conventional bellows valve includes a valve body, a bonnet, a packing box, a bellows seal assembly, packing, a stem, and a disc. On the stem inside the valve body is sheathed with the bellows seal assembly, which includes a bellows. One end of the bellows is fixed to the stem and the other end is fixed to the packing box. As shown in FIGS. 1 and 2, to improve the sealing performance and increase the service life, the bellows seal assembly is composed of two pieces of bellows rather than one and the two-piece bellows are welded in series via a lantern ring. In other words, one end of a front bellows 1' is welded to a packing box 4' and the other end is welded to a lantern ring 3' while one end of a rear bellows 2' is welded to the lantern ring 3' and the other end is welded to a lower bellows seat 5' to form the bellows seal assembly. The packing box of the valve is welded to the upper port on the bonnet to form an upper seal and the lower bellows seat 5' of the bellows seal assembly is welded to the stem to form a lower seal.

Since the bellows seal assembly is composed of two pieces of bellows connected in series, it is relatively long and the matching bonnet neck must be lengthened accordingly, so does the stem. Consequently, on the one hand, material costs are increased, and on the other hand, the length of the whole valve is increased, so does the stroke of the valve switch, thus it is unfavorable for places with height restrictions.

SUMMARY OF THE INVENTION

In view of the above-described problems, it is one objective of the invention to overcome the insufficiency of the prior art by providing a bellows seal assembly and a bellows valve equipped therewith, which is characterized by reasonable structure, low material costs, and reduced bellows valve length.

To achieve the above objective, in accordance with one embodiment of the invention, there is provided a bellows seal assembly, comprising an internal bellows, an external bellows, a hollow upper bellows seat, a first hollow lower bellows seat, and a second hollow lower bellows seat, wherein one end of the internal bellows is fixed to the upper bellows seat and the other end is fixed to the second lower bellows seat; one end of the external bellows is fixed to the upper bellows seat and the other end is fixed to the first lower bellows seat. The external bellows is sheathed around the internal bellows. The first lower bellows seat is sheathed around the second lower bellows seat. Consequently, on the one hand, material costs are reduced, and on the other hand, the length of the whole valve is reduced accordingly, so does the stroke of the valve switch.

To achieve the above objective, in accordance with another embodiment of the invention, there is provided a bellows valve, comprising a valve body, a bonnet, a packing box, packing, a stem, and a disc, wherein the bonnet is fixedly attached to the valve body by bolts. The stem is attached to the disc. The packing box is sheathed on the stem and fixed to the bonnet. Between the packing box and the stem is filled with the packing. On the valve body is disposed with a passageway, on which a disc port is disposed. The disc cooperates with the disc port. The bellows valve further comprises a bellows seal assembly comprising an internal bellows, an external bellows, an upper bellows seat, a first lower bellows seat, and a second lower bellows seat, all of which are all sheathed on the valve stem. The first lower bellows seat is fixed to the bonnet, the second lower bellows seat is fixed to the stem and the upper bellows seat movably cooperates with the stem. Consequently, on the one hand, material costs are reduced, and on the other hand, the length of the whole valve is reduced accordingly, so does the stroke of the valve switch.

In a class of this embodiment, the packing box and the bonnet are integrated as a whole. Thus, both the assembly process and the production costs are reduced.

In a class of this embodiment, the first lower bellows seat is located at the lower port of the bonnet to form a seal.

In a class of this embodiment, the upper bellows seat is movably sheathed on the stem and moves relative to the stem, which makes a distinctive contribution to the effect of the invention.

In a class of this embodiment, the upper bellows seat can move along with the stem in the same direction, which makes a distinctive contribution to the effect of the invention.

Advantages of the invention are summarized blow compared with the prior art: 1. the structure is reasonable; and 2. on the one hand, material costs are reduced and on the other hand, the length of the whole valve is reduced, so does the stroke of the valve switch, thus it is extremely favorable for places with height restrictions.

DETAILED DESCRIPTION OF THE EMBODIMENTS

The invention is explained in further detail below with reference to the example and attached drawings.

Figure 1:
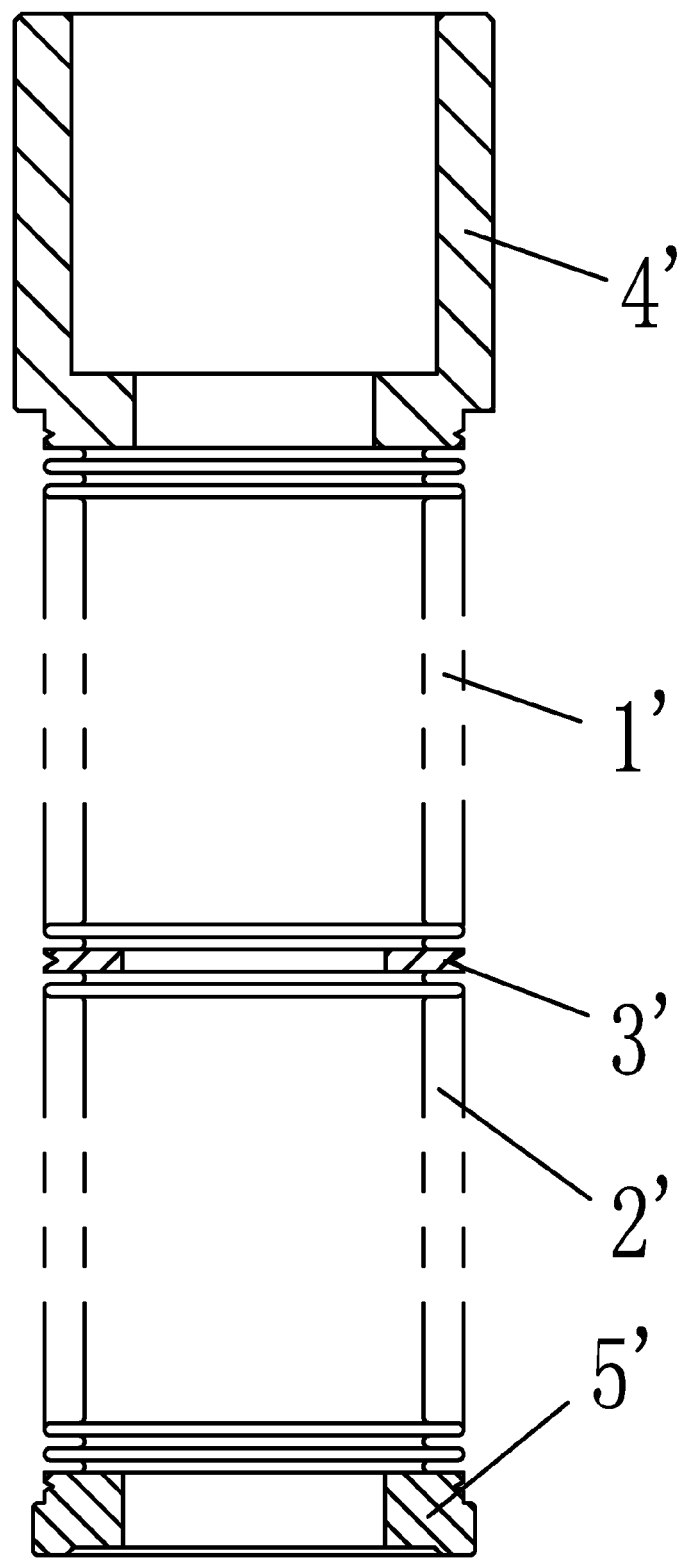
FIG. 1 is a connection diagram of a front and a rear bellows of a bellows valve in accordance with the prior art.
Figure 2:
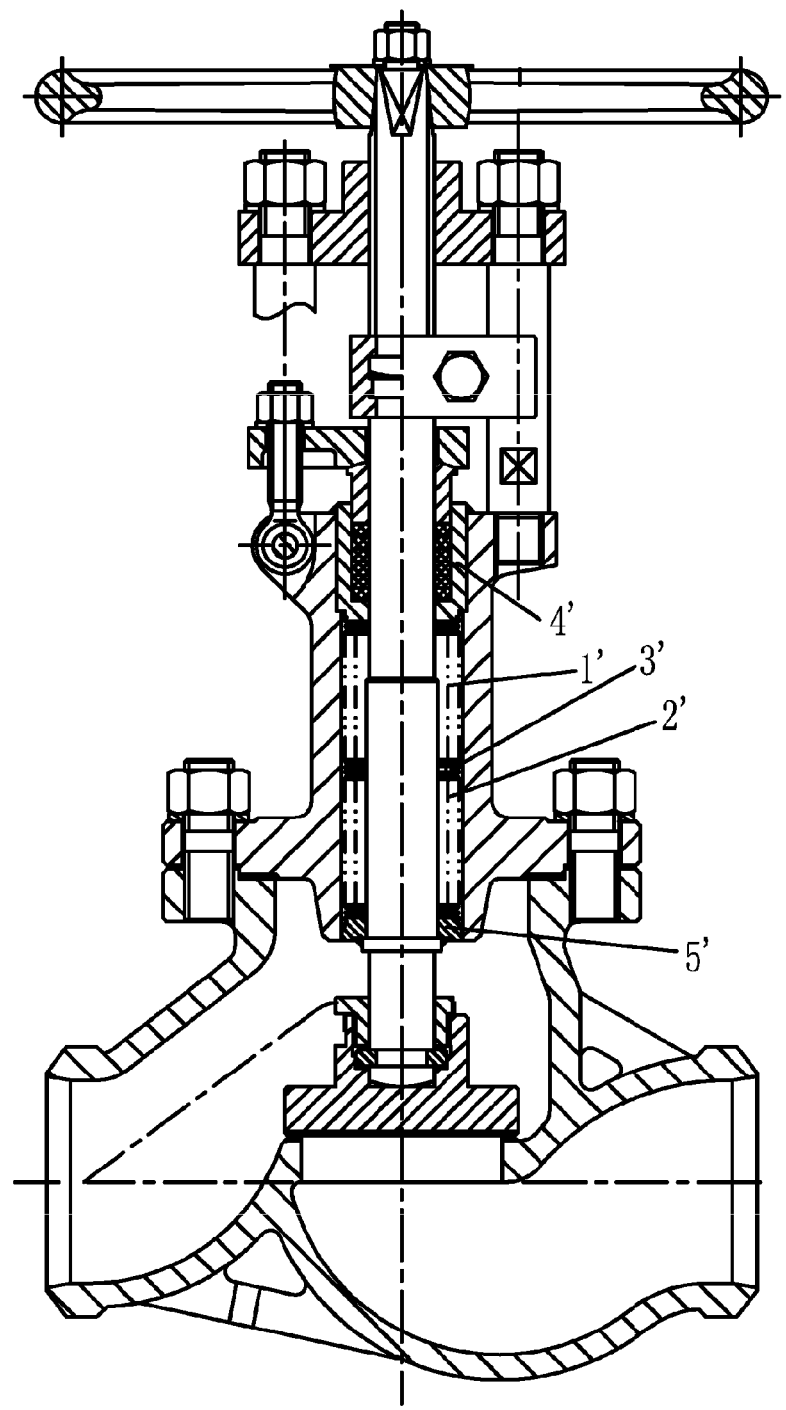
FIG. 2 is a structural representation of a bellows valve comprising a bellows assembly as shown in FIG. 1.
Figure 3:
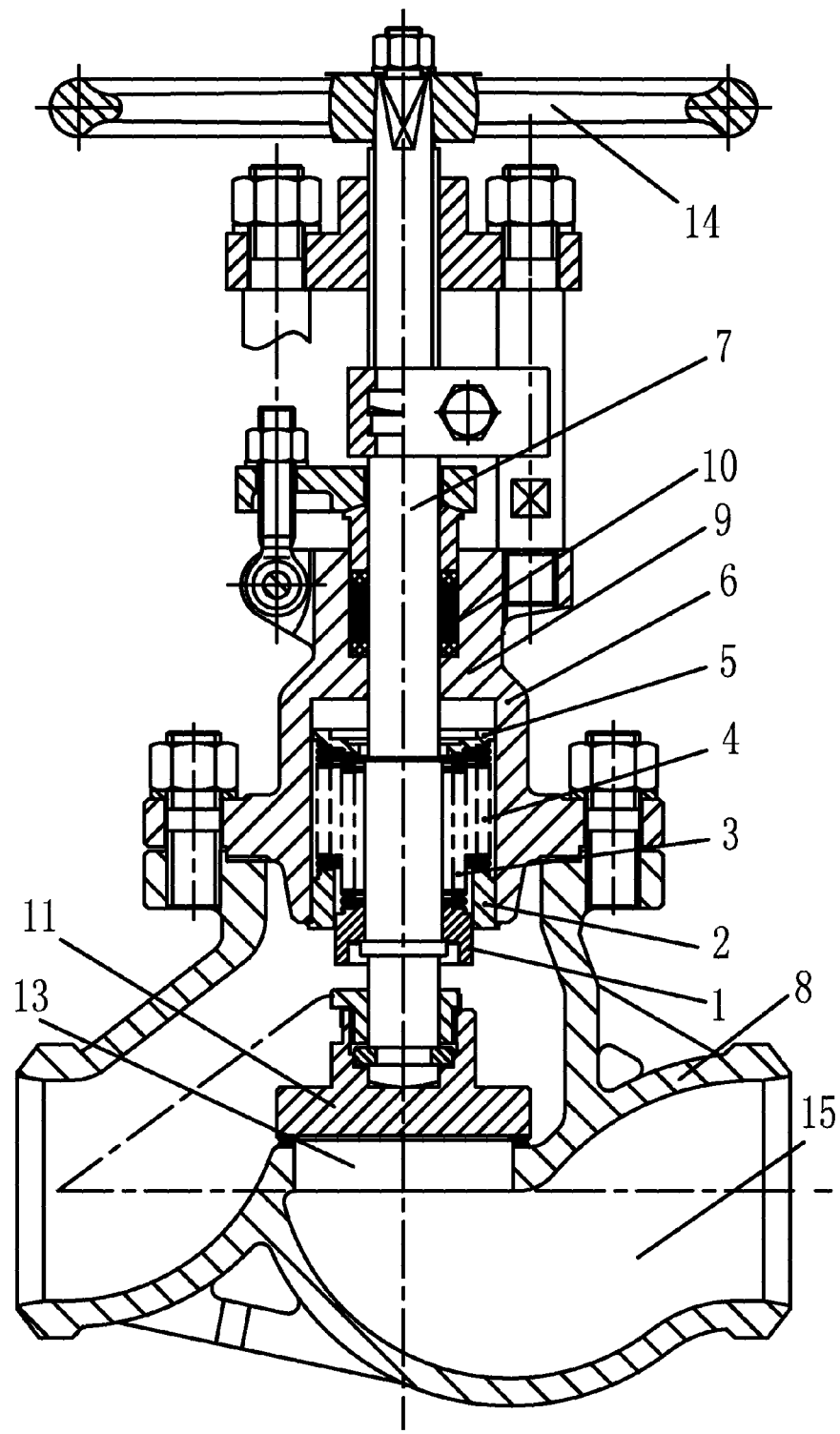
FIG. 3 is a structural representation of a bellows valve in accordance with one embodiment of the invention.
Figure 4:
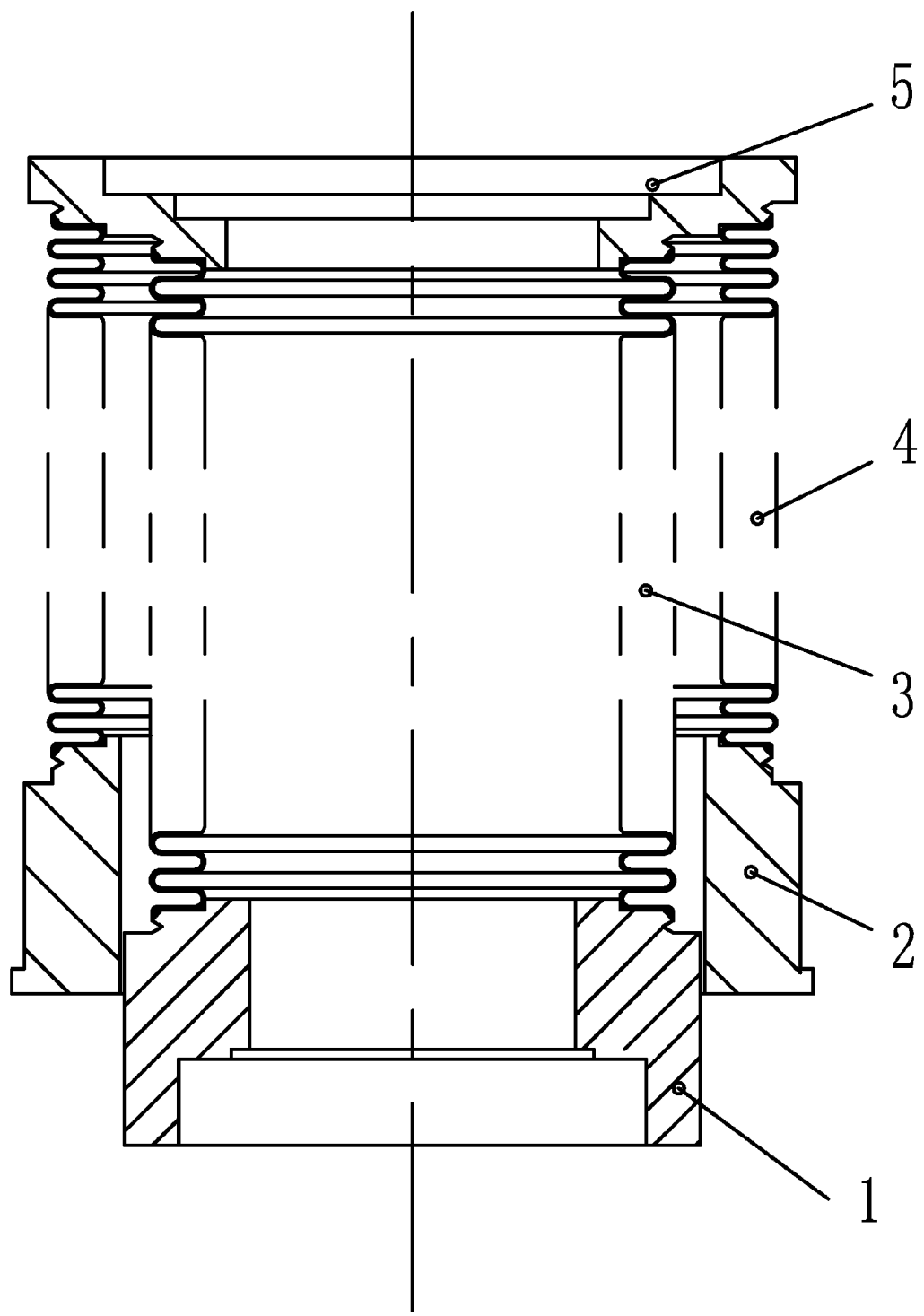
FIG. 4 is a structural representation of a bellows seal assembly in accordance with one embodiment of the invention.

As shown in FIGS. 3 and 4, a bellows valve, in accordance with this example of the invention, comprises a valve body 8, a bonnet 6, a bellows seal assembly, a packing box 9, packing 10, a stem 7, and a disc 11.

The bonnet 6 is fixedly attached to the valve body 8 by bolts. On the valve body 8 is disposed with a passageway 15, on which a disc port 13 is disposed.

One end of the stem 7 is attached to the disc 11 and the other end is attached to a hand wheel 14. The disc 11 can be driven by the stem 7 to open and close the disc port 13.

The packing box 4 is sheathed on the stem 7 and fixed to the bonnet 6. In this invention, the packing box 4 and the bonnet 6 are integrated as a whole, thus both the assembly process and the production costs are reduced. Between the packing box 4 and the stem 7 is filled with the packing 10.

A bellows seal assembly, in accordance with this example of the invention, comprises a second lower bellows seat 1, a first lower bellows seat 2, an internal bellows 3, an external bellows 4, and an upper bellows seat 5, wherein one end of the internal bellows 3 is welded to the upper bellows seat 5 and the other end is welded to the second lower bellows seat 1 while one end of the external bellows 4 is welded to the upper bellows seat 5 and the other end is welded on the first lower bellows seat 2. The first lower bellows seat 2 is sheathed around the second lower bellows seat 1. The external bellows 4 is sheathed around the internal bellows 3. The two pieces of bellows are connected in parallel to form a parallel bellows assembly.

The second lower bellows seat 1, the first lower bellows seat 2, the internal bellows 3, the external bellows 4, and the upper bellows seat 5 are all in a hollow structure and sheathed on the stem 7. The first lower bellows seat 2 is welded on the bonnet 6 and located at the lower port thereof to form a seal. The second lower bellows seat 1 is welded to the stem 7 to form a seal. The upper bellows seat 5 movably cooperates with the stem 7. In other words, the upper bellows seat 5 is movably sheathed on the stem 7 and moves relative to the stem 7. When the stem 7 moves upwards, it drives the Second lower bellows seat 1 to moves upwards, the second lower bellows seat 1 drives the internal bellows 3 to compress, the internal bellows 3 drives the upper bellows seat 5 to move upwards, and the upper bellows seat 5 drives the external bellows 4 to stretch. During the above process, the upper bellows seat 5 moves along with the stem 7 in the same direction but with different distance.

The bellows seal assembly in this example adopts two pieces of bellows connected in parallel with each bellows forming a seal. It changes the structure adopted in the prior art by connecting the two pieces of bellows in series. The bellows seal assembly itself is shortened and the matching bonnet 6 neck is shortened accordingly, so does the stem 7. Consequently, on the one hand, material costs are reduced, and on the other hand, the length of the whole valve is decreased, so does the stroke of the valve switch. It is extremely favorable for places with height restrictions such as valves mounted on the ceiling pipes or valves mounted on the pipes under the stairs.

The valve body 8 is generally made of WCB or A105 carbon steel, or type 304 stainless steel;

The disc 11 is generally made of 1025 carbon steel or type 304 stainless steel;

The stem 7 is generally made of type 304, 316, 2Cr13 or 1Cr13 stainless steel;

The bonnet 6 is generally made of WCB or A105 carbon steel or type 304 stainless steel; and The bellows is generally made of type 304 or 316 stainless steel.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A bellows valve, comprising:
a) a valve body;
b) a bonnet;
c) a packing box;
d) packing;
e) a stem;
f) a disc; and
g) a bellows seal assembly;
wherein
the bonnet is fixedly attached to the valve body by bolts;
the stem is attached to the disc;
the packing box is sheathed on the stem and fixed to the bonnet;
between the packing box and the stem is filled with the packing;
on the valve body is disposed with a passageway, on which a disc port is disposed;
the disc cooperates with the disc port;
the bellows seal assembly comprising an internal bellows, an external bellows, an upper bellows seat, a first lower bellows seat, and a second lower bellows seat, all of which are all sheathed on the valve stem;
one end of the internal bellows is fixed to the upper bellows seat and the other end is fixed to the second lower bellows seat;
one end of the external bellows is fixed to the upper bellows seat and the other end is fixed to the first lower bellows seat;
the external bellows is sheathed around the internal bellows;
the first lower bellows seat is sheathed around the second lower bellows seat;
the first lower bellows seat is fixed to the bonnet;
the second lower bellows seat is fixed to the stem; and
the upper bellows seat movably cooperates with the stem.

2. The bellows valve of claim 1, wherein the packing box and the bonnet are integrated as a whole.

3. The bellows valve of claim 1, wherein the first lower bellows seat is located at the lower port of the bonnet to form a seal.

4. The bellows valve of claim 2, wherein the first lower bellows seat is located at the lower port of the bonnet to form a seal.

5. The bellows valve of claim 1, wherein the upper bellows seat is movably sheathed on the stem and moves relative to the stem.

6. The bellows valve of claim 2, wherein the upper bellows seat is movably sheathed on the stem and moves relative to the stem.

7. The bellows valve of claim 5, wherein the upper bellows seat moves along with the stem in the same direction.

8. The bellows valve of claim 6, wherein the upper bellows seat moves along with the stem in the same direction.

* * * * *